April 9, 1957  A. M. WRIGHT  2,788,063
FLUID FLOW CONTROLS

Filed Aug. 2, 1952  2 Sheets-Sheet 1

INVENTOR
A.M. WRIGHT
BY
ATTORNEY

April 9, 1957        A. M. WRIGHT        2,788,063
FLUID FLOW CONTROLS
Filed Aug. 2, 1952        2 Sheets-Sheet 2
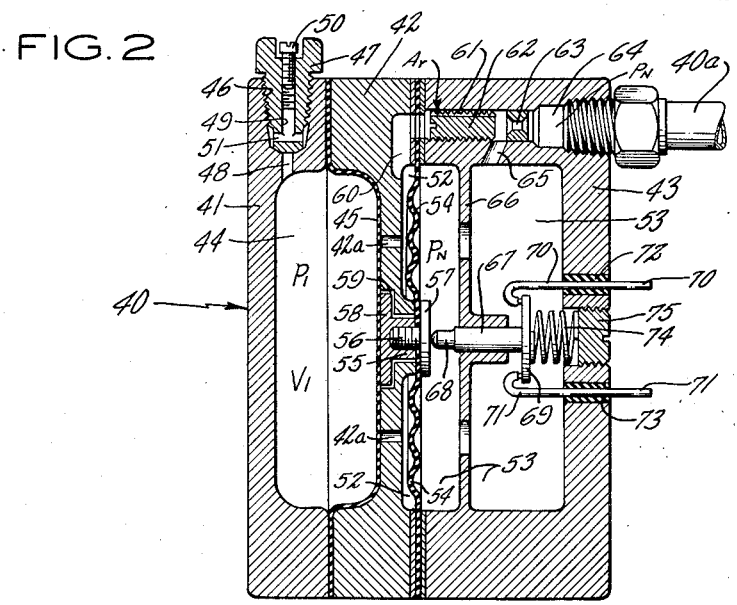
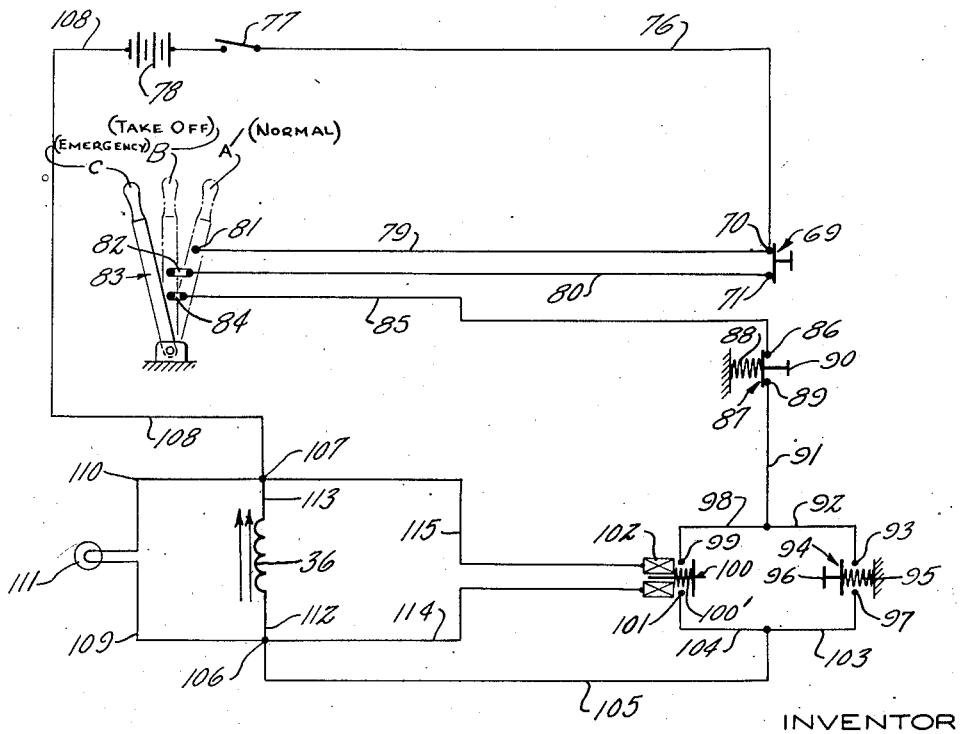
INVENTOR
A. M. WRIGHT
BY *Am Prentin*
ATTORNEY

United States Patent Office 2,788,063
Patented Apr. 9, 1957

2,788,063

FLUID FLOW CONTROLS

Alexander M. Wright, West Hartford, Conn., assignor, by mesne assignments, to Pratt & Whitney Company, Incorporated, West Hartford, Conn., a corporation of Delaware Application August 2, 1952, Serial No. 302,441

13 Claims. (Cl. 158—36.4)

This invention pertains to fluid flow control apparatus, and more particularly has reference to fuel supply systems for aircraft engines of the type disclosed in copending application of Milton E. Chandler, for Internal Combustion Engine Control, Serial No. 138,056, filed January 11, 1950, and assigned to the same assignee to which the instant application is assigned, wherein there is provided a dual fuel supply system, in which one part operates under "normal" conditions of engine operation, and the other part operates under "emergency" conditions when the normal or main part of the system has failed.

In aircraft propulsion, and especially for high speed, turbojet aircraft, it is highly desirable to detect an incipient failure of the engine fuel supply system during take-off, so that where an emergency control is provided, an automatic switchover to "emergency" may be made without delay.

One solution of this problem is to provide a sensing device that will operate on rate of change of fuel injection nozzle pressure, so that for a slow drop in nozzle pressure, such as occurs during a normal climb, no action will result, but a response will be obtained from a more rapid drop in pressure, such as would occur due to a failure of the normal fuel supply system.

Accordingly, the principal object of this invention is to devise an emergency sensing device that will detect an abnormal falling off of fuel nozzle pressure in the fuel supply system of a turbojet engine during take-off, when a failure of the fuel system is most dangerous and requires immediate correction in order to avoid disaster.

Another object of this invention is to provide in such a device means for automatically switching the fuel supply to the "emergency" system and, at the same time, indicating to the pilot that such change-over has occurred.

Still another object is to devise an emergency sensing device having means for pre-flight checking to insure that it is in proper working order before commencing flight.

A further object is to provide an emergency sensing device that will operate automatically whenever the rate of fuel nozzle pressure drop exceeds a selected value.

With these and other objects in view which may be incident to my improvements, my invention consists in the combination and arrangement of elements hereinafter disclosed and illustrated in the accompanying drawings in which:

Figure 2 is a central vertical section (partly diagrammatic) of one embodiment of my invention;

Figure 3 is a diagram of the electrical circuits connecting the emergency sensing device shown in Figure 2 with other elements of the fuel control apparatus shown in Figure 1.

Figure 1:
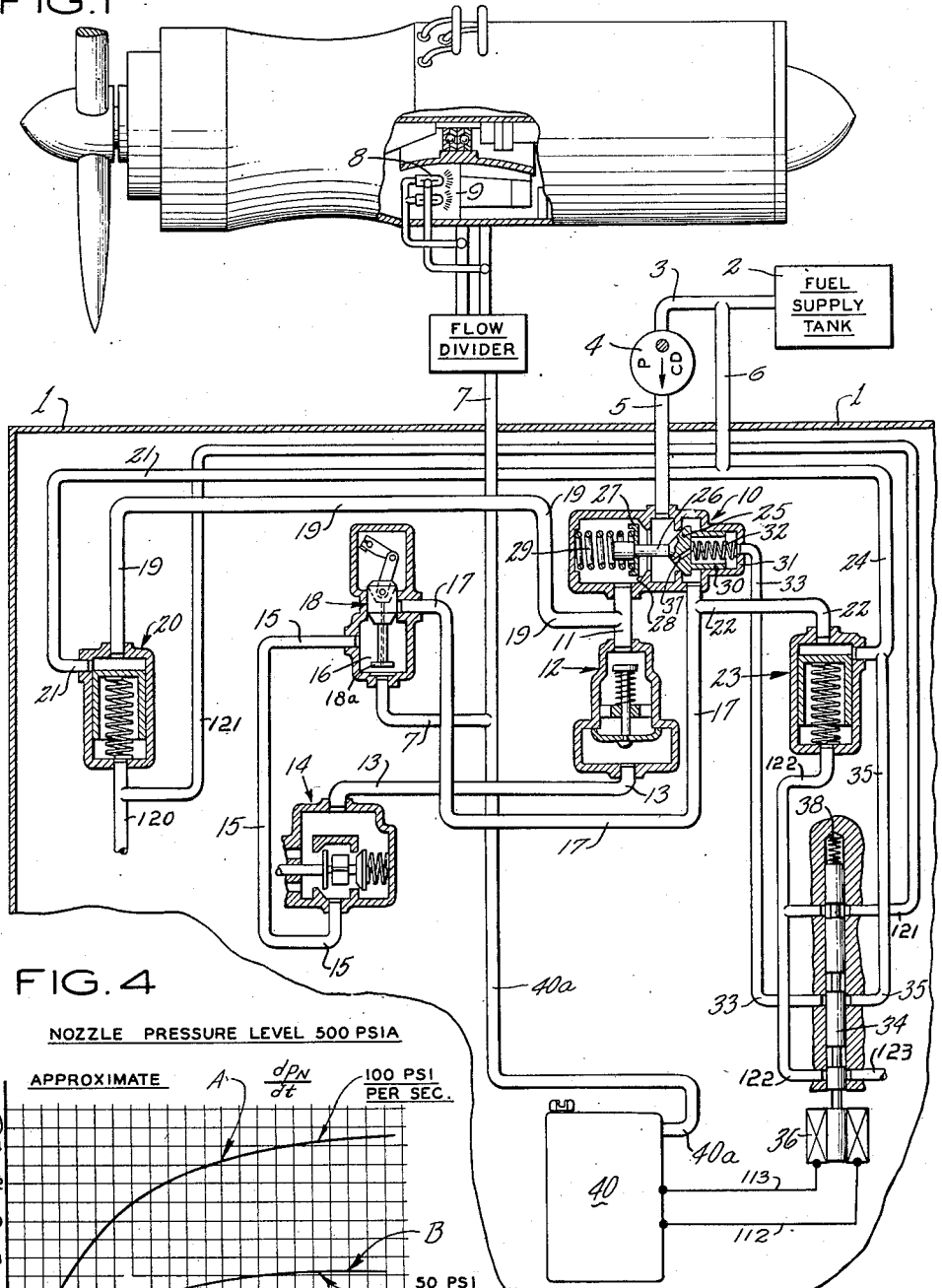
Figure 1 shows the pertinent parts of an aircraft engine fuel control apparatus, such as is disclosed in copending application, Serial No. 138,056, mentioned above, in which is incorporated an emergency sensing device according to my invention.

Referring to Figure 1, the reference numeral 1 denotes a fuel control apparatus of the type disclosed in copending application, Serial No. 138,056, mentioned above, which receives fuel from a supply tank 2 through a conduit 3, a fuel pump 4 driven by the engine and a conduit 5. A return conduit 6 provides for the return to conduit 3 of such part of the fuel delivered by pump 4 as is not required by the engine. Control apparatus 1 delivers fuel through a conduit 7 to a series of burner nozzles 8 in the combustion chamber 9 of a turbojet engine, in accordance with the requirements of the engine under various operating conditions.

Broadly comprehended, fuel control apparatus 1 comprises a main (normal) fuel supply system, in which fuel flows from inlet conduit 5, through a switch-over valve 10, conduit 11, check valve 12, conduit 13, automatic flow regulating valve 14, conduit 15, and chamber 16, to outlet conduit 7; and an emergency fuel supply system, in which fuel flows from inlet conduit 5, through switch-over valve 10, a conduit 17, manual flow regulating valve 18 and chamber 16, to outlet conduit 7.

In the main (normal) fuel supply system, such part of the fuel delivered by pump 4, through inlet conduit 5, as is not required by the engine, is returned to the inlet side of the pump, through a conduit 19, pressure regulating valve 20, conduit 21, and conduit 6; while that portion of the fuel which is delivered to the burner nozzles 8 (through check valve 12, conduit 13, valve 14, conduit 15, chamber 16 and conduit 7) is regulated by the conjoint operation of pressure regulating valve 20 and automatic flow regulating valve 14, both of which are controlled by other parts of fuel control apparatus 1 (not shown). In the emergency fuel supply system, such part of the fuel delivered by pump 4, through conduit 5, as is not required by the engine, is returned to the inlet side of the pump through a conduit 22, pressure regulating valve 23, conduit 24 and conduit 6; while that portion of the fuel which is delivered to burner nozzles 8 (through conduit 17, valve 18, chamber 16, and conduit 7) is regulated by the conjoint operation of pressure regulating valve 23 and manual flow regulating valve 18. Pressure regulating valve 23 is controlled by other parts of fuel control apparatus 1 (not shown), while manual flow regulating valve 18 is operated manually by the pilot. Valve 18 has a contoured surface whereby its flow area is progressively increased as said valve is raised from its lowest (closed) position by operation of the pilot's manual control lever (not shown). Integral with valve 18 is a fuel cut-off valve 18a (in the form of a disk) which is adapted to seat, with a fluid-tight fit, in a recess in the lower end of chamber 16 when valve 18 is in its lowest operating position, whereby it cuts off all fuel flow to the engine.

Switch-over valve 10 comprises a double headed valve, of which the head 25 is integral with a stem 26 on which is adjustably mounted a head 27 that is biased toward its seat 28 by a spring 29. Valve head 25 has an integral sleeve 30, slidably mounted in a cylinder 31, and is biased toward closed position by a spring 32. Cylinder 31 is connected through a conduit 33, solenoid valve 34, and conduits 35 and 24, to return conduit 6. When the solenoid 36 which actuates valve 34 is energized (as hereinafter described), valve 34 is raised to its upper position (as shown in Figure 1), in which it cuts off communication between conduits 33 and 35; and when solenoid 36 is de-energized, it is moved to its lower position by a spring 38 and establishes communication between conduits 33 and 35.

During operation under normal conditions, solenoid 36 is energized and cuts off communication between conduits 33 and 35. This blocks the escape from chamber 31 of fuel which entered therein through a restriction 37 in valve head 25, and thus permits the fuel pressure on both sides of valve 25 to equalize, so that spring 32 maintains valve 25 in closed position, while the fuel pressure, acting on valve head 27, overcomes spring 29 and opens said valve (as shown in Fig. 1). So long as valve 25 remains closed and valve 27 open, the fuel supply flows through the main (normal) fuel supply system (i. e., through 11, 12, 13, 14, 15 and 16), and there is no flow through the emergency fuel supply system (17, 18 and 16).

Upon a failure of the main (normal) fuel supply system, solenoid 36 becomes de-energized (as explained hereinbelow), whereupon valve 34 moves down and establishes communication between conduits 33 and 35. This permits fuel to escape from chamber 31, through conduits 33, 35, 24 and 6, faster than it can enter chamber 31 through restriction 37, so that the pressure to the left of valve 25 overcomes spring 32, opens valve 25 and closes valve 27. The fuel supply now flows through the emergency fuel supply system (17, 18, 16 and 7), to burner nozzles 8, and there is no fuel flow through the main (normal) fuel supply system.

When the main (normal) fuel supply system is in operation, the control pressure, which governs the operation of pressure regulating valve 20, is supplied from the control apparatus (not shown) through conduit 120, and is always less than the discharge pressure of pump 4, as measured by the force of the spring biasing valve 20 toward closed position. Hence, valve 20 regulates the flow of by-passed fuel through conduits 21 and 6 around pump 4. So long as the main (normal) fuel supply system is operating, control pressure from conduit 120 is transmitted to the bottom of valve 23 by conduits 121 and 122, and since said control pressure exceeds the pressure of the by-passed fuel in conduits 21 and 24, the spring acting on valve 23 will hold said valve closed.

When solenoid 36 is deenergized and spring 38 moves valve 34 to its lowest position, said valve cuts off communication between conduits 121 and 122 and, at the same time, opens communication between conduit 122 and a conduit 123, which supplies the emergency control pressure from the control apparatus (not shown), whereupon the valve 23 is operated by the emergency control pressure from conduit 123.

A fuel nozzle pressure sensing device, embodying my invention and denoted by the reference numeral 40 in Figure 1, is connected by a conduit 40a to fuel outlet conduit 7. This device, as shown in detail in Figure 2, comprises a housing of three parts 41, 42 and 43 which are securely held in assembled position as shown by any suitable means, such as connecting bolts (not shown). Housing parts 41 and 42 define a gas pressure chamber 44, in which is mounted a flexible (rubber) membrane 45 whose outer edge is securely clamped between parts 41 and 42 so that chamber 44 is air-tight. In its most distended position, membrane 45 conforms to the inner contour of housing part 42 so as to enclose a space of selected, fixed volume ($v_0$). Housing part 41 is provided with a threaded socket 46 for the reception of a threaded plug 47 whose inner end seats against the bottom of socket 46 and whose outer end has an hexagonal shape for the application of a wrench (not shown). Chamber 44 is connected to socket 46 by a port 48 and plug 47 has a threaded bore 49 which may be closed by a threaded pin 50. The lower end of plug 47 is provided with a transverse bore 51 which communicates with bore 49. When pin 50 is removed and plug 47 is unscrewed so as to disengage its lower end from sealing contact with socket 46, a gas charging conduit (not shown) may be screwed into threaded bore 49 and chamber 44 may be charged with a gas to a selected pressure ($p_0$), whereupon the volume of said gas is the same as the selected volume ($v_0$) of chamber 44. Plug 47 is then tightened so as to seal socket 46, the charging conduit is removed, and bore 49 is closed by inserting pin 50.

Housing parts 42 and 43 inclose fuel nozzle pressure chambers 52 and 53, which are separated by a flexible diaphragm 54 whose outer edge is securely clamped between parts 42 and 43, so as to form an air-tight joint. Housing part 42 is centrally bored for the reception of a flanged bushing 55 which is secured to diaphragm 54 by a threaded stud 56 having a flanged head 57. The flange 58 of bushing 55 fits slidably into a countersunk recess 59, in the wall of housing part 42; the depth of said recess being somewhat greater than the thickness of flange 58, so that said flange may project bushing 55 to the right into chamber 53, to the extent of said excess depth before contacting the bottom of said recess. A plurality of passages 42a, in the sidewall of housing 42, permits the liquid pressure in chamber 52 to act to the left on membrane 45, and compress the gas in chamber 44 until its pressure rises from its initial charging pressure ($p_0$) to a higher pressure ($p_1$) equal to the liquid pressure in chamber 52. This compression of said gas reduces its volume from its initial volume ($v_0$) to a smaller volume ($v_1$), in proportion to the ratio ($p_1/p_0$).

When chamber 44 is initially charged with gas to a selected pressure ($p_0$) (say, 100 p. s. i.), there is no liquid pressure in chamber 52, acting to the left on membrane 45, and said membrane will be pushed to the right by the charging gas until it contacts its supporting wall, as shown in Fig. 2, at which time the volume of gas in chamber 44 will have the selected maximum value ($v_0$). Whenever the pressure in chamber 52, acting to the left on membrane 45, exceeds the initial charging pressure ($p_0$) in chamber 44, membrane 45 will be moved to the left, out of contact with the wall of part 42 carrying the passages 42a, until the pressure ($p_1$) in chamber 44 rises (by compression of the gas therein) to a value equal to the pressure in chamber 52; and as long as membrane 45 is out of contact with said wall, the pressure in chamber 52 will always equal the pressure in chamber 44, by virtue of the free movement of membrane 45.

Since membrane 45 can be moved to the left, out of contact with its supporting wall, only where the pressure ($p_1$) in chamber 52 exceeds the selected initial pressure ($p_0$) in chamber 44, said pressures will remain equal in value only as long as the pressure in chamber 52 exceeds the selected pressure ($p_0$). If now the pressure in chamber 52 decreases to a value equal to the selected value ($p_0$), i. e., 100 p. s. i., membrane 45 will move to the right, until it contacts its supporting wall (as shown in Fig. 2), whereupon the pressure ($p_1$) in chamber 44 (and hence in chamber 52) will be equal to the selected charging pressure ($p_0$). Any further decrease in the pressure in chamber 52 below ($p_0$=100 p. s. i.), will not appreciably reduce the pressure in chamber 44 below the value of the selected charging pressure ($p_0$), because membrane 45, being now confined by the boundary walls of the diaphragm chamber, can not move further to the right to increase the volume of gas in chamber 44 beyond the selected volume ($v_0$); and any addition to volume ($v_0$), from the very slight movement of flange 58 to the right of its flush position (as shown in Figure 2), is so small as to be negligible.

Chamber 52 communicates through a passage 60 with a bore 61, in which are located a threaded plug restriction 62 and a fixed restriction 63, through which fuel under nozzle pressure ($p_N$) enters from inlet 64, connected by conduit 40a with fuel outlet conduit 7 leading to burner nozzles 8. Chamber 53 is connected to bore 61, between restrictions 62 and 63, by a passage 65. Restriction 63 is larger than restriction 62, so that when the fuel pressure ($p_N$) in inlet 64 falls below the fuel pressure ($p_1$) in chamber 52, fuel escapes from chamber 53, through passage 65 and restriction 63, faster than the fuel in chamber 52 can escape through restriction 62. A pressure differential ($p_1 - p_N$) is thus set up which acts on diaphragm 54 and moves said diaphragm (together with bushing 56) to the right until flange 58 of bushing 55 contacts the bottom of recess 59.

Slidably mounted in a transverse partition 66 in chamber 53 is a stud 67, having at its left end a rounded head 68, and at its right end, a plate 69 which is adapted to contact the ends of a pair of hooked pins 70 and 71 mounted in the right end wall of chamber 53, and electrically insulated therefrom by insulations 72 and 73. A spring 74 biases plate 69 and stud 67 to the left against the force of diaphragm 54. When the fuel pressure ($p_N$) in chamber 53 is equal to the pressure ($p_1$) in chamber 52 and there is no force exerted by diaphragm 54, spring 74 maintains plate 69 in contact with pins 70 and 71, but when the fuel pressure ($p_N$) in chamber 53 falls below the pressure ($p_1$) in chamber 52 so that the pressure differential ($p_1-p_N$) acting on diaphragm 54 exceeds the force of spring 74, stud 67 and plate 69 are moved to the right and break contact between plate 69 and pins 70 and 71. The total movement of stud 67 and plate 69 is only a few thousandths of an inch, so that plate 69 functions as a microswitch across pins 70 and 71. A plug 75 threaded in the right end wall of chamber 53 permits adjustment of the tension in spring 74.

The electrical circuits which connect the fuel nozzle pressure senser, just described, with other elements of the fuel control system of Figure 1, are shown in Figure 3, wherein the pin 70 of Figure 2 is connected by a wire 76, through a main throw switch 77 to the positive pole of a battery 78. Wires 79 and 80 connect pins 70 and 71, respectively, with contacts 81 and 82 of a three-position switch 83, whose third contact 84 is connected by a wire 85 with one contact 86 of a test switch 87. A spring 88 biases switch 87 in a normally closed position against contact 86 and a second contact 89, but switch 88 may be opened by pressing push button 90 to the left, so as to overcome the force of spring 88; for the purpose of testing the electrical system, as hereinafter described.

Contact 89 is connected by wires 91 and 92 to one contact 93 of a reset switch 94 which is normally held in open position by a spring 95, but which can be closed momentarily by pressing push button 96 to the right, against the force of spring 95, until connection is made between contact 93 and a second contact 97. Contact 89 is also connected by wires 91 and 98 to one contact 99 of a solenoid relay lockout switch 100 which is held in open position by a spring 100', when the solenoid 102 is de-energized. However, when solenoid 102 is energized, it moves switch 100 to closed position against contact 99, and a second contact 101.

Contacts 97 and 101 are connected by wires 103, 104 and 105 with a junction 106 of a divided circuit whose other junction point 107 is connected by a wire 108 to the negative pole of battery 78. Junction points 106 and 107 are connected: by wires 109 and 110 through an electric signal lamp 111 on the control panel in the pilot's cockpit; by wires 112 and 113 through solenoid 36 of valve 34 (Figure 1); and by wires 114 and 115 through solenoid 102.

*Operation*

The operation of the fuel nozzle pressure sensing device 40 in association with the fuel control apparatus shown in Figure 1 will now be described.

The chamber 44 (Figure 2) is charged with a gas to a selected control pressure ($p_0$), say 100 pounds per square inch (p. s. i.), and is then sealed, as described hereinabove. The flexible membrane 45 will then contact the right wall of chamber 44, as shown in Figure 2, and the volume of the gas in said chamber will have a selected value ($v_0$). Fuel at nozzle pressure ($p_N$) will flow from conduit 7 through conduit 40a, inlet 64 and restriction 63 into bore 61, and from thence, through passage 65, into chamber 53 and also, through restriction 62 and passage 60, into chamber 52. After a time the pressure in chamber 52 will equal the ($p_1$) in chamber 44 because of the passages 42a between said chambers and the flexible membrane 45. The pressure in chamber 52 will also be the same as the pressure ($p_N$) in chamber 53. In this state, since the pressure on both sides of diaphragm 54 is the same, no force will be exerted by said diaphragm upon stud 67 and spring 74 will hold switch 69 in closed position.

If now the pressure ($p_N$) in inlet 64 decreases, a flow of liquid will occur simultaneously from chamber 53 through restriction 63 and from chamber 52 through the much smaller restriction 62, whose effective area is ($A_r$). Since the liquid escapes from chamber 53 much faster than it can escape from chamber 52, there appears across restriction 62 and diaphragm 54 a pressure drop ($p_1-p_N$) which tends to force said diaphragm to the right, against the resistance of spring 74. If the pressure drop ($p_1-p_N$) is large enough to overcome the force of spring 74, the switch 69 will open. If the drop in ($p_N$) pressure is very slow, the differential ($p_1-p_N$) will be too small to open switch 69. The response of the system to different rates of reduction of nozzle pressure ($p_N$) is shown by the curves in Figure 4.

Starting with the engine at rest and the electrical system (Figure 3) de-energized, the battery switch 77 is closed to energize the electrical circuits in Figure 3. Assuming the emergency switch 83 has been left in "normal" (position A in Figure 3), closing the reset switch 94 energizes the emergency solenoid 36, simultaneously lighting the indicator lamp 111 to indicate to the pilot that the fuel control apparatus 1 is on the "main" (normal) fuel supply system. At this time, the lockout relay solenoid 102 is also energized to close switch 100 and complete the circuit through the "rate of pressure" or "emergency senser" switch 69.

After the engine has been started and brought up to speed, an "emergency" check may be made as follows:

(a) Place emergency manual switch at "take-off" (position B, Figure 3).

(b) Press button 90 to open "test" switch 87. This throws the fuel control apparatus, explained in column 2 line 15 through column 3 line 4 hereinabove, onto the emergency fuel supply system by de-energizing the emergency solenoid 36, at the same time de-energizing the lockout relay coil 102, which opens the lockout relay switch 100, and prevents the fuel control apparatus from returning to main fuel supply system, when the test button 90 is released. At this time, the control indicating light 111 goes out, showing that the fuel control apparatus is on the emergency system. The actual transition from "main" to "emergency" can usually be felt as a momentary drop in propulsive thrust.

(c) Press button 96 to momentarily close reset switch 94, which restores the fuel control apparatus to the main fuel supply system.

(d) Place emergency manual switch 83 at "normal" (position A, Figure 3).

When the engine has been brought up to the required speed (R. P. M.), and prior to starting the take-off run, the manual emergency switch 83 should be placed at "take-off" (position B, Figure 3). This arms the system for automatic switch to "emergency" operation, in case of an abnormal falling off of fuel nozzle pressure ($p_N$). After the airplane has taken off and climbed to a safe altitude, and before throttling back to "cruising" speed, the manual emergency switch 83 should be placed in "normal" (position A, Figure 3). If this is not done, throttling back the engine may throw the control apparatus into "emergency" operation.

In case of an automatic switch to emergency during take-off, the lockout relay solenoid 102 becomes de-energized. If this feature were not provided, the re-establishment of nozzle pressure ($p_N$) after the switch-over of the control apparatus to "emergency" operation would cause the fuel control apparatus to return to "main" fuel system operation, and there would be continuous oscillations between the "emergency" and "main" systems, which condition is avoided by locking out the main system.

During flight, the control apparatus may be placed in emergency operation by throwing the manual switch 83 from "normal" (position A) to "emergency" (position C).

In the test procedure outlined above, the actual functioning of the nozzle pressure sensing switch 69 is not verified, and as an alternative scheme, it may be desirable to have the test switch operate a fuel dump valve, so that an actual loss of nozzle pressure can be simulated. Such an actual loss of nozzle pressure can also be obtained by pulling back on the throttle, and with the manual switch 83 at "take-off" (position B), this will switch the fuel control apparatus to "emergency" operation.

The following analysis shows the principles of operation of the rate of pressure drop sensing device shown in Figure 2, in terms of the following nomenclature:

$A_{B1}$—Effective area of diaphragm 54, sq. in.
$A_R$—Flow area of restricting passage 61, sq. in.
$C$—Coefficient of flow through restricting passage 61, cu. in. per p. s. i.
$e$—Exponential, 2.71828 . . .
$k_{B1}$—Spring rate of spring, #/inch
$p_0$—Initial charged pressure of gas in chamber 44, p. s. i.
$p_1$—Control chamber (44) pressure, p. s. i.
$p_N$—Nozzle fuel pressure, p. s. i.
$q$—Flow through restriction 61, in.$^3$ per sec.
$t$—Time, seconds
$V$—Volume of liquid in chamber 52 combined volume of the liquid in chamber 52 and in chamber 44, to the right of membrane 45, in.$^3$
$v_0$—Initial charged volume of gas in chamber 44.
$v$—Volume of gas in chamber 44, in.$^3$, under pressure ($p_1$).
$x$—Travel of diaphragm 54 (i. e., plate 57)
$\tau$—Time constant, seconds Equilibrium of diaphragm 54 is described by:

$$p_1 - p_N = k_{B1} \frac{(x_0 - x')}{A_{B1}} \quad (1)$$

where $x'$ is the length of spring 74, $x_0$ being its free length, and $(x_0 - x') = x$, is the travel of diaphragm 54.

Now suppose, starting from a condition of $$p_{1_0} = p_{N_0}$$

that the pressure in chamber 53 starts to fall at a constant rate $$\left(\frac{dp_N}{dt}\right)$$

During this fall in pressure, $p_1 > p_N$. Then at any time $t$, the pressures will be $p_N$ and $p_1$, and the equilibrium is described by (1).

Flow through restriction 62:

$$q = CA_r(p_1 - p_N) \quad (2)$$

The flow $q$ through 62 is caused by and equal to the expansion of the air behind diaphragm 45, minus the volume absorbed by the movement of diaphragm 54 to the right (in the positive $x$ direction), hence also $$q = \frac{dv_1}{dt} - A_{B1}\frac{dx}{dt} \quad (2a)$$

Differentiating (1):

$$\frac{dx}{dt} = -\frac{A_{B1}}{k_{B1}} \cdot \frac{d}{dt}(p_N - p_1) \quad (3)$$

With isothermal conditions in chamber 44, we have:

$$p_1 v_1 = p_0 v_0$$

hence $$v_1 = \frac{p_0 v_0}{p_1}$$

and $$\frac{dv_1}{dt} = -\frac{p_0 v_0}{p_1^2} \cdot \frac{dp_1}{dt} \quad (3a)$$

Substituting (3) and (3a) in (2), and then equating (2) and (2a):

$$CA_r(p_1 - p_N) = -\frac{p_0 v_0}{p_1^2} \cdot \frac{dp_1}{dt} + \frac{A_{B1}^2}{k_{B1}} \cdot \frac{d}{dt}(p_N - p_1) \quad (4)$$

This last equation can be rearranged as follows:

$$(p_N - p_1) = \frac{1}{CA_r}\left[\frac{p_0 v_0}{p_1^2} + \frac{A_{B1}^2}{k_{B1}}\right]\frac{dp_1}{dt} - \frac{1}{CA_r} \cdot \frac{A_{B1}^2}{k_{B1}} \cdot \frac{dp_N}{dt} \quad (5)$$

Substitute the symbol $\tau$ for $$\frac{1}{CA_r}\left[\frac{p_0 v_0}{p_1^2} + \frac{A_{B1}^2}{k_{B1}}\right] \text{ in } (5):$$

$$(p_N - p_1) = \tau \frac{dp_1}{dt} - \frac{1}{CA_r} \cdot \frac{A_{B1}^2}{k_{B1}} \cdot \frac{dp_N}{dt}$$

and this last can be re-arranged as follows:

$$\tau \frac{dp_1}{dt} + (p_1 - p_N) = +\frac{1}{CA_r} \cdot \frac{A_{B1}^2}{k_{B1}} \cdot \frac{dp_N}{dt} \quad (6)$$

Noting that $$\tau \frac{dp_1}{dt} = \tau \frac{d}{dt}(p_1 - p_N) + \tau \frac{dp_N}{dt}$$

(6) becomes $$\tau \frac{d}{dt}(p_1 - p_N) + (p_1 - p_N) = -\left[\tau - \frac{1}{CA_r} \cdot \frac{A_{B1}^2}{k_{B1}}\right]\frac{dp_N}{dt} \quad (7)$$

To predict the performance of the device, we assume that $\tau$ is constant during its action, which is fairly close to reality since the action takes place during a small displacement of the diaphragm 54.

Then the solution of (7) is $$(p_1 - p_N) = -\left[\tau - \frac{1}{CA_r} \cdot \frac{A_{B1}^2}{k_{B1}}\right] \cdot \frac{dp_N}{dt}[1 - e^{-t/\tau}] \quad (8)$$

Substituting the value of $\tau$, viz., $$\frac{1}{CA_r}\left[\frac{p_0 v_0}{p_1^2} + \frac{A_{B1}^2}{k_{B1}}\right], \text{ in } (8):$$

$$(p_1 - p_N) = -\frac{dp_N}{dt} \cdot \frac{1}{CA_r} \cdot \frac{p_0 v_0}{p_1^2}[1 - e^{-t/\tau}] \quad (9)$$

Let it be assumed that the device shown in Figure 2 is to detect a pressure rate of change of 20 p. s. i. per second, and specify that this is to provide a $(p_1 - p_N)$ of 2 p. s. i. for actuating the diaphragm 54 when $p_1 = 600$ p. s. i.

To keep the charging pressure $p_0$ from getting too high, $CA_R$ should be madle as low as possible, say .01 cubic inch per second per p. s. i.

For example, if we arbitrarily choose $\tau = .25$ second, Then in (9) put $(p_N - p_1) = 2.0$ p. s. i.

$\frac{dp_N}{dt} = 20$ p. s. i./sec.

$CA_R = .01$ cubic inch/sec. per p. s. i.

$p_1 = 600$ p. s. i.

$\tau = .25$

Equation (9) then is:

$$2 = 20 \times \frac{1}{.01} \times \frac{p_0 v_0}{360,000} \times \{1 - e^{-4t}\}$$

$$360 = p_0 v_0 \times \{1 - e^{-4t}\} \quad (10)$$

After a long time the exponent term disappears, and $$p_0 v_0 = 360$$

The design of chamber 44 and membrane 45 and the charging pressure must then satisfy this last condition.

If the charging pressure is 100 p. s. i., then the volume of gas in chamber 44 must be 3.60 cubic inches when $p_1$ is equal to the charging pressure.

The size of chamber 44 governs the size of the device. In this example, if the chamber size is 3.60 cubic inches, then the volume of gas therein can never exceed this, and the device will not hold the emergency switch 68 open when $p_1$ falls below 100 p. s. i., absolute, until $P_N$ falls below 96 p. s. i., for the following reasons. The volume of fuel per second $q$ flowing out through restriction 62 is determined by the volume of fuel in chamber between membrane 45 and the wall carrying passages 42a, which in turn is equal to the difference between the maximum volume $v_0$ of gas in chamber 44 (when $p_1 = p_0 = 100$ p. s. i.), and the reduced volume $v_1$ in chamber 44, when the fuel pressure $p_1$ in chamber 52 exceeds the charging pressure $(p_0)$ in chamber 44. As long as the pressure differential $p_1 - p_N$, resulting from the fuel flow $q$ through restriction 61, exceeds that required to overcome the force of spring 74 (e. g., 4 p. s. i.) valve 69 will open and remain open. However, when the pressure $p_1$ in chamber 44 (owing to the discharge through restriction 62) falls to a value of the assumed charging pressure, viz., 100 p. s. i. (i. e., $p_1 = p_0$), membrane 45 is in contact with its supporting wall carrying passages 42a, and liquid flow through restriction 62 ceases, whereupon the pressure differential $(p_1 - p_N)$ becomes zero, which is less than that (e. g., 4 p. s. i.) required to hold valve 60 open, and hence when $(p_1)$ falls to a value of 100 p. s. i. $= (p_0)$ or below, the device will not hold switch 69 open, until $p_N$ falls below 96 p. s. i.

Putting the above constants in Equation 10, and making the approximation that $p_1 = 500$ p. s. i. during the time of operation of the unit, we get $$(p_N - p_1) = \frac{dp_N}{dt} \times \frac{1}{.01} \times \frac{360}{250,000}\{1 - e^{-4t}\}$$

$$= \frac{dp_N}{dt} \times .144\{1 - e^{-4t}\} \quad (11)$$

Figure 4:
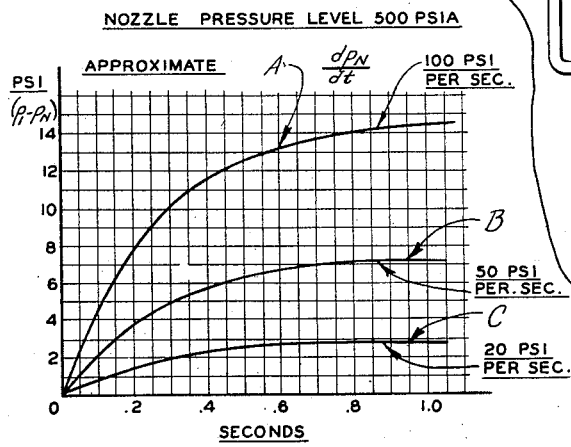
Figure 4 is a diagram showing the characteristic response of my emergency senser to a steady rate of drop in fuel nozzle pressure.

Equation 11 shows the response of the unit to the time rate of change of the pressure $(p_N)$ in chamber 53, for these conditions; as indicated by curve C of Figure 4, wherein the ordinates show the unit differential pressure $(p_1 - p_N)$ acting on diaphragm 54, and the abscissas show elapsed time of response, in seconds.

Thus, if the unit differential pressure $(p_1 - p_N)$ is changing at the rate of 100 p. s. i. per second, the unit will respond as shown in curve A of Figure 4; if said rate of change is 50 p. s. i. per second, the response is as shown by curve B; while if said rate of change is 20 p. s. i. per second (as assumed in the foregoing example resulting in Equation 11), the response is as shown in curve C. If a unit differential pressure $(p_1 - p_N)$ of 4 p. s. i. is required to open switch 69, it is apparent from curves A, B and C of Figure 4, that switch 69 will open in .08 second for a rate of change of $(p_1 - p_N)$ of 100 p. s. i. per second; and in .21 second, for a rate of change of $(p_N - p_1)$ of 50 p. s. i. per second; while said switch will not open at all when the rate of change $(p_1 - p_N)$ falls to 20 p. s. i. per second, until $p_N$ falls below 96 p. s. i.

When $p_N$ in chambers 53 and 52 falls below $p_1 = 100$ p. s. i., a differential pressure of $(100 - p_N)$ acts on bushing 55 (over the area of flange 58), and this pressure differential continues to increase as $p_N$ continues to fall further below 100 p. s. i. When $p_N$ falls to a value such that the pressure differential $(100 - p_N)$, applied to the area of flange 58, produces a force (acting to the right on bushing 55) greater than that of spring 74, switch 69 will open. Since the area of flange 58 is smaller than the area of diaphragm 54, the pressure differential $(100 - p_N)$, acting on flange 58, must exceed 4 p. s. i. (which, when acting on said diaphragm 54, is just sufficient to open switch 69), by an amount equal to the difference in areas of flange 58 and diaphragm 54. If these two areas were equal, switch 69 would open whenever $p_N$ was less than 96 p. s. i., i. e. $(p_1 - p_N) = 4$ p. s. i. However, since the area of flange 58 is smaller than that of diaphragm 54, switch 69 will not open until $p_N$ has fallen to a value below 96 p. s. i. Nevertheless, switch 69 will always open whenever $p_N$ falls to a value (below 96 p. s. i.) such that the pressure differential $(100 - p_N)$ acting on flange 58 produces a force which exceeds the force of spring 74. Thus, if the area of flange 58 were, say one-fourth the area of diaphragm 54, switch 69 would always open whenever $p_N$ fell to a value below $(100 - 4 \times 4) = 84$ p. s. i., even when the rate of decrease of the pressure differential $(p_1 - p_N)$ is less than 20 p. s. i. per second.

While I have shown and described my invention as applied to a fuel supply system for aircraft engines, it is apparent that it may also be applied to any liquid flow control system, to indicate and function upon a change in pressure of the flowing liquid, when the rate of said change exceeds a selected predetermined rate.

I also desire it to be understood that while I have shown and described a preferred embodiment of my invention, I do not limit myself to the particular details of construction and arrangement of elements disclosed by way of illustration, as these may be changed and modified by those skilled in the art without departing from the spirit of my invention or exceeding the scope of the appended claims.

I claim:

1. An internal combustion engine fuel supply apparatus comprising a main fuel supply system and an emergency fuel supply system, arranged to alternatively supply fuel to said engine; first means for switching the operation of said apparatus from said main to said emergency system and vice versa; second means for always automatically actuating said first means to operate said emergency system whenever the fuel pressure in said main system falls below a selected value; and third means, responsive to the rate of change of fuel pressure in said main system, for automatically actuating said second means and thereby actuating said first means, whenever said main system fuel pressure decreases at a rate which exceeds a selected predetermined value, whereby said emergency system is automatically brought into operation upon the occurrence of such rate of decrease of fuel pressure in said main system.

2. A fuel supply apparatus according to claim 1, wherein said third means is adapted to automatically actuate said second means only when the fuel pressure in said main system decreases at a rate which exceeds a selected predetermined value, whereby said first means is not automatically actuated by said second means when said main system fuel pressure decreases at a rate less than said predetermined value.

3. A fuel supply apparatus according to claim 1, including signal means for simultaneously indicating to the operator of said engine, a switch from said main to emergency system operation.

4. A fuel supply apparatus according to claim 3, including means for checking the operability of said emergency system, comprising: manually operated means for simultaneously actuating, independently of said third means, said second and first means and said signal means, thereby switching the operation of said apparatus from said main to emergency system, and indicating said switch to said operator; and manually operated means for restoring said apparatus to main system operation.

5. A fuel supply apparatus according to claim 1, including means for automatically locking out said main system upon automatic switch from said main to emergency system operation, whereby said apparatus is prevented from automatically returning to main system operation when the fuel pressure in said emergency system increases to a value equal to the original fuel pressure in said main system.

6. A fuel supply apparatus according to claim 5, including manually operable means, operatively associated with said locking out means, for restoring said apparatus to main system operation after an automatic switch from said main to emergency system operation.

7. In an internal combustion engine fuel flow control apparatus, having a main fuel supply system for supplying fuel to said engine under normal operating conditions, and an emergency fuel supply system for supplying fuel to said engine upon failure of said main system, said systems being connected in parallel between a common fuel inlet to a common fuel outlet and having a switch-over valve at the point of junction of said systems with said common fuel inlet, adapted to alternatively connect either of said systems to said common inlet; a fuel pressure sensing device comprising: first means for sensing the rate of decrease in the discharge fuel pressure of said control apparatus, and second means operatively associated with said first means and responsive to said rate of decrease for automatically operating said switch-over valve, whenever said discharge fuel pressure decreases at a rate which exceeds a selected predetermined rate; whereby, upon failure of said main fuel supply system due to decrease in the fuel pressure therein, said emergency system is automatically brought into operation.

8. An internal combustion engine fuel supply apparatus comprising a single fuel pump, and a main fuel supply system and an emergency fuel supply system, connected in parallel between said pump and engine, and arranged to alternatively supply fuel under a selected pressure to said engine; first means for automatically operating said emergency system whenever the fuel pressure in said main system falls below a selected minimum value; and second means, responsive to the rate of decrease of fuel pressure in said main system, for automatically actuating said first means whenever said main system fuel pressure decreases at a rate which exceeds a selected predetermined value, whereby said emergency system is automatically brought into operation upon the occurrence of such rate of decrease in fuel pressure.

9. A fuel supply apparatus according to claim 8, wherein said second means is adapted to automatically actuate said first means only when said rate of decrease exceeds a selected predetermined value, whereby said first means is not automatically actuated by said second means when said rate of decrease is less than said predetermined value.

10. A fuel supply apparatus according to claim 8, including signal means for simultaneously indicating to the operator of said engine, a change from said main to emergency system operation.

11. A fuel supply system according to claim 10, including means for checking the operability of said emergency system, comprising: manually operated means for simultaneously actuating said first means and said signal means, independently of said second means, thereby changing the operation of said apparatus from said main to emergency system, and indicating such change to the operator; and manually operated means for restoring said apparatus to main system operation.

12. A fuel supply apparatus according to claim 8, including means for automatically locking out said main system upon automatic change from main to emergency system operation, whereby said apparatus is prevented from automatically returning to main system operation when the fuel pressure in said emergency system increases to a value equal to the original fuel pressure in said main system.

13. A fuel supply apparatus according to claim 12, including manually operable means, operatively associated with said locking out means, for restoring said apparatus to main system operation after an automatic change from main to emergency system operation.

References Cited in the file of this patent

UNITED STATES PATENTS

| | | |
|---|---|---|
| 1,125,407 | Shipman | Jan. 19, 1915 |
| 2,061,079 | Lacoe | Nov. 17, 1936 |
| 2,278,805 | Taplin | Apr. 7, 1942 |
| 2,347,962 | Oliver | May 2, 1944 |
| 2,445,335 | Philbrick | July 20, 1948 |
| 2,468,768 | Malick | May 3, 1949 |
| 2,497,431 | Beman | Feb. 14, 1950 |
| 2,596,815 | Keil | May 13, 1952 |
| 2,614,617 | Bobier | Oct. 21, 1952 |
| 2,628,472 | Dray et al. | Feb. 17, 1953 |
| 2,681,694 | Loft | June 22, 1954 |